C. MATTSON.
MEANS FOR LOADING AND UNLOADING TRUCKS.
APPLICATION FILED OCT. 5, 1911.

1,025,287.

Patented May 7, 1912.

2 SHEETS—SHEET 1.

Inventor
Charles Mattson

C. MATTSON.
MEANS FOR LOADING AND UNLOADING TRUCKS.
APPLICATION FILED OCT. 5, 1911.
1,025,287.
Patented May 7, 1912.
2 SHEETS—SHEET 2.
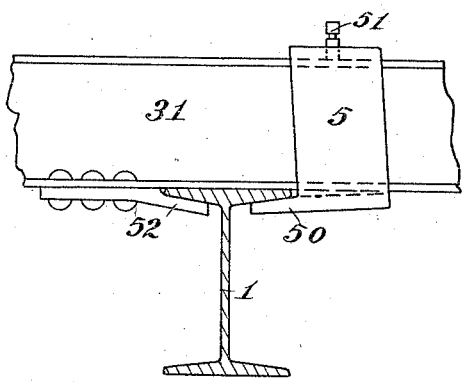
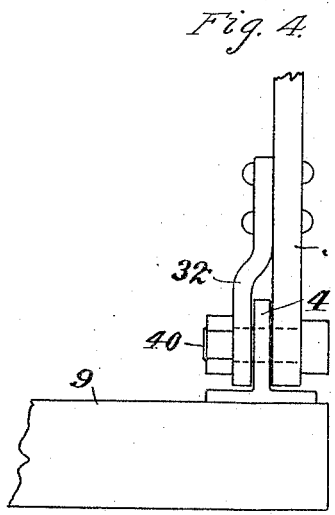
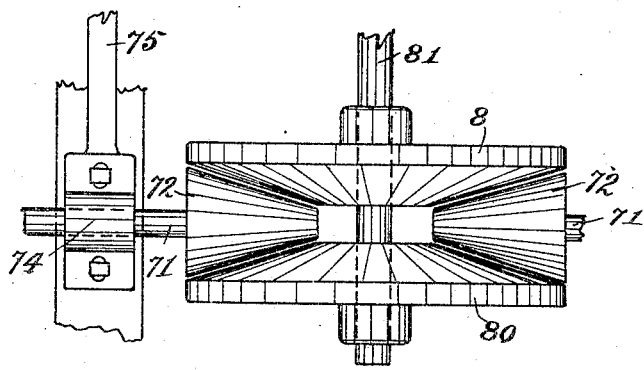
Witnesses
Walter B. Allen
Ben C. Graham
Inventor
Charles Mattson
by Henry L. Reynolds
Attorney.

UNITED STATES PATENT OFFICE.

CHARLES MATTSON, OF BREMERTON, WASHINGTON.

MEANS FOR LOADING AND UNLOADING TRUCKS.

1,025,287.  Specification of Letters Patent.  Patented May 7, 1912.

Application filed October 5, 1911. Serial No. 653,033.

*To all whom it may concern:*

Be it known that I, CHARLES MATTSON, a citizen of the United States, and resident of the city of Bremerton, in the county of Kitsap and State of Washington, have invented certain new and useful Improvements in Means for Loading and Unloading Trucks, of which the following is a specification.
My invention relates to an improvement in means for loading and unloading trucks, and comprises the novel parts and combinations of parts which will be hereinafter described and particularly pointed out in the claims.

The object of my invention is to provide means whereby the motor which is used for propelling automobile trucks may be used for handling the loads in loading and unloading.

In the accompanying drawings I have shown my invention in the form which is now preferred by me.

Figure 1:
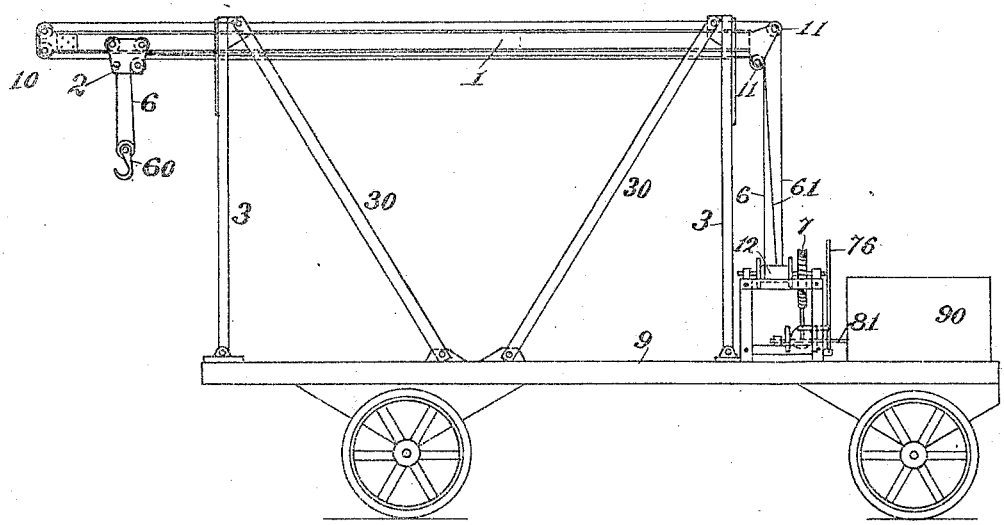
Figure 2:
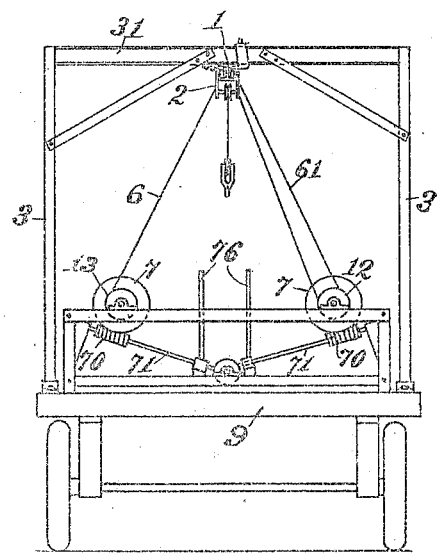

Figure 1 is a side elevation of a truck having my invention thereon. Fig. 2 is an end elevation of the same. Fig. 3 is a detail showing the manner of detachably securing the trackway beam to the supporting frame. Fig. 4 shows the manner of removably attaching the supporting frame to the truck platform. Fig. 5 shows a preferred form of friction driving connection between the hoisting or winding drums and the motor.

My device may be placed upon any form of automobile trucks and will greatly facilitate the handling of the loads in placing them upon or removing them from the truck. It is so designed that at it may be readily removed from or placed upon the truck as conditions of use may dictate.

For handling the loads I employ an elevated trackway extending lengthwise the truck and projecting at the rear beyond the rear end of the truck platform, upon which trackway travels a trolley carriage operated by ropes from hoisting drums adapted to be operated from the motor by which the truck is driven. The form of elevated trackway which I prefer is that shown in detail in Fig. 3, this consisting of an I-beam 1, the lower flanges of which serve as the track surface for the trolley carriage 2. This trackway is supported by a frame work consisting of posts 3, 3, and braces 30, 30, supported from the margins of the track platform, and transverse beams 31 which extend across the platform and connect the posts of opposite sides of the truck. For convenience in removing and putting in place this supporting frame, I have provided means whereby it may be conveniently secured and disconnected from the platform. The means herein shown for doing this consists in providing the platform with lugs or eyes 4 which are adapted to register with eyes formed in the lower ends of the posts 3 or braces 30, these latter being preferably provided with additional eyed lugs 32 and all being secured by pivot bolts 40.

The trackway beam 1 is detachably secured to the transverse beams so that it may be quickly put in place and taken down. The means shown for this consists in providing the transverse beams with a projecting lug or ear 52 between which and the lower surface of the transverse beam the upper flange of the trackway beam 1 may be inserted. In connection with and supplementing this is a movable clamp or slide 5 movable lengthwise the transverse beam and having an ear or lug 50 adapted to pass beneath and engage the under surface of the top flange at the other side of the trackway beam 1. This clamp or slide may be secured in place upon the transverse beam by a set screw 51, or any other convenient and suitable means. By sliding this clamp back the trackway beam may be put in place or removed, and by sliding it up toward the fixed ears 52, the beam may be securely held in place.

The trolley carriage 2 may be of any approved construction. It contains wheels which travel upon the lower flanges of the trackway beam 1 and a pulley or pulleys adapted to receive the load hoisting rope 6. One end of this rope may, as is shown, be secured to the trolley carriage and then pass about a block 60 and thence about the wheel mounted in the carriage and thence to the hoisting drum. The power of the hoist may be varied by varying the number of pulleys used in the fall block and carriage about which the hoist rope passes. A traversing rope 61 is secured by its ends to the carriage and passes about guide pulleys 10 and 11 at the ends of the trackway beam to the traversing drum 12, whereby the carriage may be moved along the trackway as desired. The hoist rope passes to a hoisting drum 13 by which it is operated. The two drums 12 and 13 are connected with the motor of the truck so that they may be operated therefrom in either direction as desired. I have shown this as being done by the following means: The shaft of the drum is provided with a worm wheel 7, with which gears a worm 70 upon a shaft 71. At their inner ends the shafts 71 are provided with friction pulleys 72, adapted to be engaged with either of two friction disks, 8 and 80, which are secured upon a shaft 81, which shaft may be the shaft of the truck motor or an extension thereof, or a shaft which is geared to turn with said motor. The shafts 71 are mounted in bearings 74 adapted to be moved by a connected bar 75, so as to engage the friction pulleys 72 with either of the friction disks 8 and 80. These bars 75 may be controlled and moved by levers 76.

In use for placing a load upon the truck the trolley carriage is run to the rear until it is beyond the rear end of the truck platform, which may be done because of the rear projection of the trackway beyond the platform. The truck is placed so that the load is beneath this rearward extension of the trackway, or the load brought to the corresponding position. The fall block is then lowered and attached to the load. By applying the proper friction device the load may be raised, and when raised to the proper height the other drum may be operated to draw the trolley carriage inward so as to convey the load to any point over the truck platform, when it may be lowered.

In unloading the truck the operation is reversed. In this way heavy loads may be quickly and easily placed upon or removed from the truck, making it possible to do a great deal more work with the truck than would be possible by other means, and also doing this work with more safety and less possibility of accident or damage than where this work is done by hand.

When it is not necessary or desirable to use this power loading device, the supporting frame and trackway may be quickly taken down and removed from the truck, leaving its platform free and open for the loading and handling of any form of bulky goods.

What I claim as my invention is:

1. The combination with a motor truck, of a frame work consisting of posts having disengageable connection with the margins of the truck platform, transverse beams supported in elevated position by said posts above the truck platform, an I-beam adapted to form a trolley trackway and of a length to project rearwardly beyond the platform, releasable clamping devices adapted to secure said trackway beam to the transverse beams, a trolley carriage running upon the lower flanges of the trackway beam, guide pulleys carried by opposite ends of the trackway beam, hoist and traversing ropes extending over the said guide pulleys to the trolley carriage, winding mechanisms upon the truck receiving said hoist and traversing ropes, and means for reversely operating said winding mechanisms from the truck propelling motor.

2. The combination with a truck, of posts rising from the margins of the truck platform, beams supported from the upper ends of said posts and extending transversely of the platform, a trackway consisting of an I-beam extending lengthwise beneath said transverse beams and projecting beyond the rear end of the truck platform, means for supporting said trackway beam comprising members secured to the transverse beams and having lugs adapted to project under the upper flange of said I-beam on one side, and slides supported from and movable lengthwise said transverse beams and having each a finger or lug adapted to extend under the upper flange at the opposite side of the trackway beam, means for securing said slides in adjusted position, a trolley mounted to travel upon the lower flanges of the trackway beam and carrying load supporting and hoisting mechanisms.

In testimony whereof I have hereunto affixed my signature at Bremerton, Washington, this 25th day of September, 1911.

CHARLES MATTSON.

Witnesses:
ROBERT L. JENNER,
E. R. CARLS.